US006628870B2

(12) United States Patent
Yamaguchi

(10) Patent No.: US 6,628,870 B2
(45) Date of Patent: Sep. 30, 2003

(54) BLOCK GAIN EQUALIZER

(75) Inventor: Shohei Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/730,788

(22) Filed: Dec. 7, 2000

(65) Prior Publication Data

US 2001/0003550 A1 Jun. 14, 2001

(30) Foreign Application Priority Data

Dec. 10, 1999 (JP) ............................................ 11-351175

(51) Int. Cl.$^7$ .............................. G02B 6/02; G02B 6/26
(52) U.S. Cl. ......................................... 385/123; 385/42
(58) Field of Search ................................. 385/123, 140, 385/42; 372/6; 359/341.4, 341.41, 341.42

(56) References Cited

U.S. PATENT DOCUMENTS

| 5,808,785 | A | | 9/1998 | Nakabayashi | 714/4 |
| 5,818,629 | A | | 10/1998 | Kinoshita | 359/337.11 |
| 5,995,275 | A | | 11/1999 | Sugaya | 359/341.3 |
| 6,025,947 | A | * | 2/2000 | Sugaya et al. | 359/134 |
| 6,038,061 | A | * | 3/2000 | Sugaya | 359/160 |
| 6,198,572 | B1 | * | 3/2001 | Sugaya et al. | 359/161 |
| 6,335,821 | B1 | * | 1/2002 | Suzuki et al. | 252/182.11 |
| 6,373,625 | B1 | * | 4/2002 | Kobayashi et al. | 359/337.12 |

FOREIGN PATENT DOCUMENTS

| EP | 0 859 435 A2 | 8/1998 |
| JP | 05-224254 | 9/1993 |
| JP | 08-250785 | 9/1996 |
| JP | 08-264871 | 10/1996 |
| JP | 09-120090 | 5/1997 |
| JP | 09-211507 | 8/1997 |
| JP | 10-257028 | 9/1998 |
| JP | 11-068205 | 3/1999 |
| JP | 11-122192 | 4/1999 |
| JP | 11-312839 | 11/1999 |

OTHER PUBLICATIONS

European Search Report dated Jun. 26, 2002.
Japanese Office Action dated Jun. 25, 2002, with partial English translation.

* cited by examiner

Primary Examiner—Georgia Epps
Assistant Examiner—Jack Dinh
(74) Attorney, Agent, or Firm—McGinn & Gibb, PLLC

(57) ABSTRACT

To provide a block gain equalizer, which controls an amount of gain slope, and does not cause any loss in an optical signal. A block gain equalizer 201 branches an optical signal transmitted from an optical fiber transmission path $101_N$ by an optical coupler 112 to take out a supervisory signal 119 by a band pass filter. An electric signal 122 after this photoelectric conversion is inputted into a gain control circuit 207 to read slope correction data for flattening the gain. The gain control circuit 207 supplies a gain control signal 208 to a semiconductor laser 204 to drive it by power which corresponds to the gain slope for flattening the gain, for pumping an erbium doped fibers 202 in accordance with a backward pumping system. Thereby, the block gain equalizer 201 is capable of flattening the frequency characteristic without any loss in optical signal. It is also possible to adjust the gain by an attenuator as required. Also, for the pumping system, various systems can be adopted.

20 Claims, 14 Drawing Sheets

FIG. 3
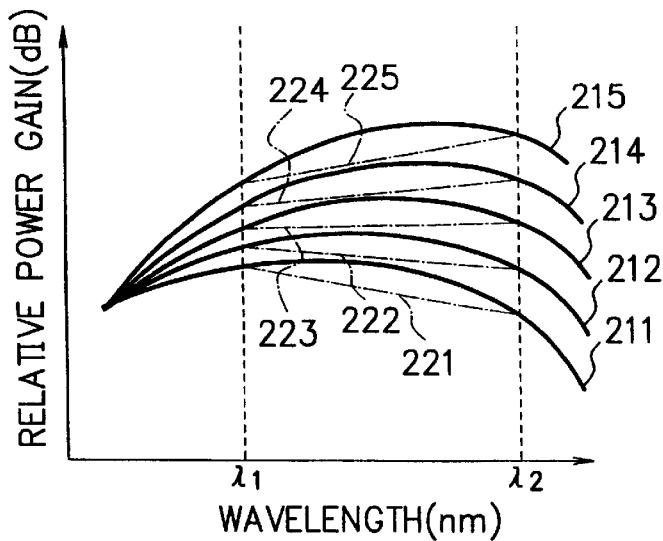
FIG. 4
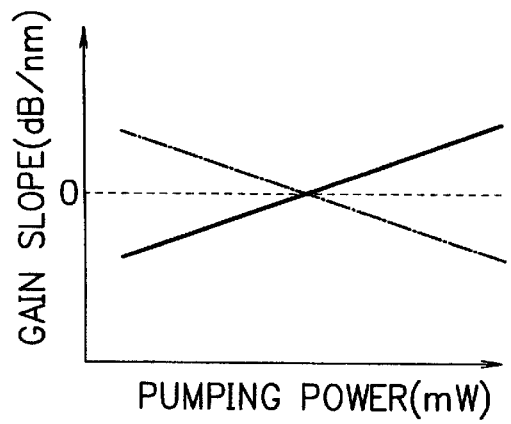
FIG. 5
| SLOPE CORRECTION DATA | PUMPING POWER | INCREASED POWER |
|---|---|---|
| $S_1$ | $P_1$ | $A_1$ |
| $S_2$ | $P_2$ | $A_2$ |
| ⋮ | ⋮ | ⋮ |
| $S_5$ | $P_5$ | $A_5$ |
241

BLOCK GAIN EQUALIZER

BACKGROUND OF THE INVENTION

The present invention relates to a block gain equalizer for adjusting gain in an optical transmission system, and more particularly to a block gain equalizer suitable for being inserted in a relaying section of an optical fiber transmission path to adjust gain of an optical signal.

DESCRIPTION OF THE PRIOR ART

Optical transmission systems often transmit a large quantity of signals by wavelength multiplexing an optical signal to transmit through an optical fiber transmission path.

FIG. 17 represents a principal part of an optical transmission system in which optical fiber transmission paths are connected together. A plurality of optical fiber transmission paths $101_1$, $101_2$, ... $101_N$ have optical repeaters $102_1$, $102_2$, ... $102_{N-1}$ disposed among those to amplify a reduced optical signal. In such an optical transmission system, the respective optical fiber transmission paths $101_1$, $101_2$, ... $101_N$ do not uniformly reduce the gain with distance for all frequencies used for optical signals, but a rate of the reduction differs depending upon the frequency. This also applies to a case of each optical repeater $102_1$, $102_2$, ... $102_{N-1}$, and Raman amplification causes ununiformity in terms of frequency in an amplification factor. When it is approximately considered that attenuation or amplification of these frequencies occurs at a predetermined slope, it can be regarded that the respective optical fiber transmission paths $101_1$, $101_2$, ... $101_N$ have loss slopes, and the respective optical repeaters $102_1$, $102_2$, ... $102_{N-1}$ have gain slopes. In other words, one optical transmission system has a frequency characteristic determined by a sum of loss slopes due to the respective optical fiber transmission paths $101_1$, $101_2$, ... $101_N$ and gain slopes due to the respective optical repeaters $102_1$, $102_2$, ... $102_{N-1}$.

The optical transmission system is designed so as to flatten the gain of the entire system in consideration of these loss slopes and gain slopes. Actually, however, the characteristics of the optical fiber transmission paths $101_1$, $101_2$, ... $101_N$ and the optical repeaters $102_1$, $102_2$, ... $102_{N-1}$ may be different from what has been expected due to variations in their manufacture and the like. When this "deviation" exceeds a certain tolerance, the system called "transmission path" does not hold. Thus, in order to prevent such a matter, the block gain equalizer is inserted in the transmission path for each predetermined relaying section in the optical transmission system. Thus, the gains for the respective frequencies are flattened by these block gain equalizers.

FIG. 18 illustrates the state in descriptively. As an example here, a block gain equalizer 103 is disposed behind an optical repeater $102_{N-1}$ at the last stage shown in FIG. 17. In this example, the frequency characteristic of the first optical fiber transmission path $101_1$ is a flat characteristic with respective frequencies having equal signal levels as shown as the first characteristic measurement result $104_1$. If the frequency characteristic of the optical fiber transmission path $101_N$ behind the optical repeater $102_{N-1}$ at the last stage inclines by a large amount depending upon the frequency as shown as the N-th characteristic measurement result $104_N$, the block gain equalizer 103 is disposed behind it. This block gain equalizer 103 has such a frequency characteristic 105 as to offset the gain slope corresponding to a change in the frequency. Accordingly, the characteristic measurement result 106 of the optical signal after passage of this block gain equalizer 103 is flattened with respect to the frequency.

FIG. 19 represents a circuit configuration of a block gain equalizer for controlling such a gain. This block gain equalizer 103 has an optical coupler 112 which branches an optical signal 111 inputted from the optical fiber transmission path $101_N$. One optical signal 113 branched by the optical coupler 112 is inputted to a variable gain equalizer 114, where the gain is flattened, and thereafter, it is transmitted to an optical fiber 116 at the following stage as the optical signal 115.

On the other hand, the other optical signal 117 branched by the optical coupler 112 is inputted to a band pass filter (BPF) 118, where only optical signals of a predetermined band are selected. Assuming the optical signals inputted into the block gain equalizer 103 are constituted by signals having respective wavelengths as shown at (a) in FIG. 19 (differences in intensity of signal level are not indicated here), a specific wavelength $\lambda_{SV}$ of those wavelengths is used as a supervisory signal. The band pass filter 118 selects the supervisory signal 119 having this wavelength $\lambda_{SV}$. (b) in FIG. 19 shows a state in which only the supervisory signal 119 has passed through the band pass filter 118.

The supervisory signal 119 thus selected is inputted into a photodiode (PD) 121, and is photoelectric-converted into an electric signal 122. This electric signal 122 representing the supervisory signal 119 is inputted into a gain control circuit 123, which reads data on loss slope previously incorporated in the supervisory signal 119 to input, into the variable gain equalizer 114, such a voltage signal 125 as to become a loss slope designated. As a result, the gain of the optical signal 115 (see FIG. 19(c)) obtained is flattened with respect to the used frequency band. Of course, this data on the loss slope may be data transmitted to this block gain equalizer 103 through other paths.

FIG. 20 represents an example of a characteristic of the conventional variable gain equalizer. The variable gain equalizer 114 is adapted such that the loss slope relative to wavelength changes in response to the voltage level of the voltage signal 125. In this figure, when the voltage signal 125 indicates 3V (volt), the frequency characteristic is flat as indicated by solid line, and no correction is performed. When the voltage signal 125 indicates 2V, the variable gain equalizer has such a characteristic that the more the wavelength $\lambda$ is increased, the less becomes the loss. When the voltage signal 125 indicates 4V, the variable gain equalizer has such a characteristic that the more the wavelength $\lambda$ is increased, the more becomes the loss. Therefore, the variable gain equalizer 114 is capable of adjusting the gain of the optical signal 113 in response to the voltage signal 125 to output an optical signal 115, which has become flat with respect to the frequency.

SUMMARY OF THE INVENTION

The variable gain equalizer 114 shown in FIG. 19 flattens the gain by changing the attenuation factor relative to the frequency of an optical signal inputted. Therefore, the optical signal inputted into the block gain equalizer 103 does not increase the signal level although the signal level may be reduced. For this reason, apart from a case where the block gain equalizer 103 is inserted at the last stage of the transmission path, when it is inserted in a section along the path, the length of the optical fibers in the section has to be made shorter than other sections. This leads to a problem that the optical transmission system becomes expensive.

It is an object of the present invention to provide a block gain equalizer which controls an amount of gain slope and does not cause any loss in optical signal.

According to the invention specified in claim 1, there is provided a block gain equalizer having: (a) doped fibers added with rare earth elements for receiving an optical signal transmitted from a transmission path on the upstream side and relaying to a transmission path on the downstream side; (b) a pumping source for injecting pumping light into the doped fibers; and (c) power setting means for setting power of the pumping light to be outputted by this pumping source to power, which corresponds to gain characteristic for correcting the frequency characteristic of the optical signal transmitted from the transmission path.

More specifically, according to the invention specified in claim 1, focusing attention to the fact that when the power of the pumping light to be injected into the doped fibers added with rare earth elements is appropriately adjusted, the frequency characteristic of the gain due to the doped fibers changes, a block gain equalizer to be disposed in the transmission path in order to equalize the gain is caused to contain the doped fibers, and the power of the pumping source is set to power which corresponds to gain characteristic for correcting the frequency characteristic of an optical signal. Thereby, such gain loss as when equalizing is performed by an attenuator does not occur.

According to the invention specified in claim 2, there is provided a block gain equalizer having: (a) doped fibers added with rare earth elements for receiving an optical signal transmitted from a transmission path on the upstream side and relaying to a transmission path on the downstream side; (b) a pumping source for injecting pumping light into the doped fibers; (c) power setting means for setting power of the pumping light outputted by this pumping source to power which corresponds to a gain characteristic for correcting the frequency characteristic of the optical signal transmitted from the transmission path; and (d) an attenuator for attenuating, by a predetermined amount, the optical signal amplified by the doped fibers by the use of the pumping light of the power set by this power setting means.

More specifically, according to the invention specified in claim 2, focusing attention to the fact that when the power of the pumping light to be injected into the doped fibers added with rare earth elements is appropriately adjusted, the frequency characteristic of the gain due to the doped fibers changes, a block gain equalizer to be disposed in the transmission path in order to equalize the gain is caused to contain the doped fibers, and the power of the pumping source is set to power which corresponds to gain characteristic for correcting the frequency characteristic of an optical signal. Thereby, such gain loss as when equalizing is performed by an attenuator does not occur. Since, however, the doped fibers are used, there are cases where the gain is increased conversely and it is judged to be undesirable to transmit an optical signal through a transmission path having a predetermined length. Thus, according to the invention specified in claim 2, there is prepared an attenuator for attenuating, by a predetermined amount, an optical signal obtained by amplifying by the doped fibers. If the attenuation for the amount thus amplified is not required, the invention specified in claim 1 will be applied.

According to the invention specified in claim 3, there is provided a block gain equalizer having: (a) doped fibers added with rare earth elements for receiving an optical signal transmitted from a transmission path on the upstream side and relaying to a transmission path on the downstream side; (b) a pumping source for injecting pumping light into the doped fibers; (c) characteristic storing means in which there is stored, in advance, the frequency characteristic of an amplification factor relative to various values of power in injecting the pumping light into the doped fibers; (d) power setting means for setting power of the pumping light which corresponds to desired frequency characteristic stored in this characteristic storing means on the basis of data on an instruction to flatten the frequency characteristic of the optical signal; and (e) an attenuator for attenuating, when the amplification factor of the optical signal amplified by the doped fibers by the use of the pumping light of power set by this power setting means is higher than a desired value, this amplification factor to the desired value.

More specifically, according to the invention specified in claim 3, focusing attention to the fact that when the power of the pumping light to be injected into the doped fibers added with rare earth elements is appropriately adjusted, the frequency characteristic of the gain due to the doped fibers changes, a block gain equalizer to be disposed in the transmission path in order to equalize the gain is caused to contain the doped fibers, and the power of the pumping source is set to power which corresponds to gain characteristic for correcting the frequency characteristic of an optical signal. For this reason, according to the invention specified in claim 3, there is prepared characteristic storing means in which there has been stored, in advance, the frequency characteristic of amplification factor relative to various values of power in injecting the pumping light into the doped fibers, and there is to be set power of pumping light which corresponds to desired frequency characteristic stored in this characteristic storing means on the basis of data on an instruction to flatten the frequency characteristic of the optical signal. Even in the invention specified in claim 3, the amplification factor of an optical signal obtained by amplifying by the doped fibers by the use of the pumping light may be higher than a desired value. In such a case, there is used an attenuator for attenuating this to the desired value.

According to the invention specified in claim 4, there is provided a block gain equalizer having: (a) doped fibers added with rare earth elements for receiving an optical signal transmitted from a transmission path on the upstream side and relaying to a transmission path on the downstream side; (b) a pumping source for injecting pumping light to the doped fibers; (c) characteristic storing means in which there are stored, in advance, the frequency characteristics of amplification factor relative to various values of power in injecting the pumping light into the doped fibers; (d) characteristic distinguishing means for distinguishing the frequency characteristic of the optical signal; (e) power setting means for selecting an optimum frequency characteristic to flatten the frequency of a characteristic distinguished from among frequency characteristics stored in the characteristic storing means by this characteristic distinguishing means to set power of the pumping light corresponding thereto; and (f) an attenuator for attenuating, when the amplification factor of the optical signal amplified by the doped fibers by the use of the pumping light of power set by this power setting means is higher than a desired value, this amplification factor to the desired value.

More specifically, according to the invention specified in claim 4, focusing attention to the fact that when the power of the pumping light to be injected into the doped fibers added with rare earth elements is appropriately adjusted, the frequency characteristic of the gain due to the doped fibers changes, a block gain equalizer to be disposed in the transmission path in order to equalize the gain is caused to contain the doped fibers, and the power of the pumping source is set to power which corresponds to gain characteristic for correcting the frequency characteristic of an optical signal. For this reason, according to the invention specified in claim 4, there is prepared characteristic storing means in which there has been stored, in advance, the frequency characteristic of amplification factor relative to various values of power in injecting the pumping light into the doped fibers, and there is provided characteristic distinguishing means for distinguishing the frequency characteristic of an optical signal inputted, and by selecting an optimum frequency characteristic to flatten the frequency of a characteristic obtained by distinguishing from among frequency characteristics stored in the characteristic storing means by this characteristic discriminating means to set the power of pumping light corresponding thereto. Even in the invention specified in claim 4, the amplification factor of an optical signal obtained by amplifying by the doped fibers by the use of the pumping light having power set by this power setting means may be higher than a desired value. In such a case, there is used an attenuator for attenuating this amplification factor to the desired value.

The invention specified in claim 5 is characterized in that the pumping source pumps the doped fibers in accordance with a backward pumping system in a block gain equalizer according to claim 1 to claim 4.

Thereby, it is possible to realize a high-efficiency block gain equalizer having low power consumption.

The invention specified in claim 6 is characterized in that the pumping source pumps the doped fibers in accordance with the forward pumping system in a block gain equalizer according to claims 1 to 4.

This enables a block gain equalizer having a less amount of worsened noise factor to be realized even if the input light intensity is increased.

The invention according to claim 7 is characterized in that the pumping source consists of a light source for the backward pumping system and a light source for the forward pumping system in a block gain equalizer according to claims 1 to 4, and one of these light sources is selected under predetermined conditions to pump the doped fibers.

As described above, according to the invention specified in claim 7, the backward pumping system and the forward pumping system are properly used, and therefore, the optical transmission system can be kept in a better condition by properly using the high-efficiency backward pumping system with low power consumption and the forward pumping system which has a less amount of worsened noise factor even though the input light intensity is increased.

BRIEF DESCRIPTION OF THE DRAWINGS

The objects and features of the present invention will become more apparent from the consideration of the following detailed description taken in conjunction with the accompanying drawings, in which:

FIG. 3 is a characteristic diagram showing relative power gain to each wavelength of erbium (Er) doped fibers used in the first embodiment;

FIG. 4 is a characteristic diagram showing relationship between pumping power of the erbium doped fibers shown in FIG. 3 and gain slope;

FIG. 5 is an explanatory view showing a principal part of a ROM table for controlling an amount of gain slope in the first embodiment;

DESCRIPTION OF THE PREFERRED EMBODIMENTS

Hereinafter, with reference to embodiments, the present invention will be described in detail.

First Embodiment

Figure 2:
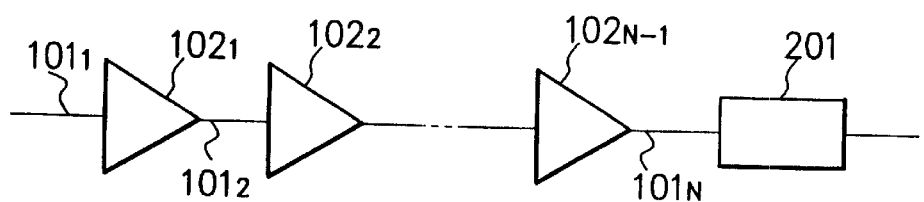
FIG. 2 is a block diagram showing a principal part of an optical transmission system in which a block gain equalizer according to the first embodiment is used.
Figure 18:
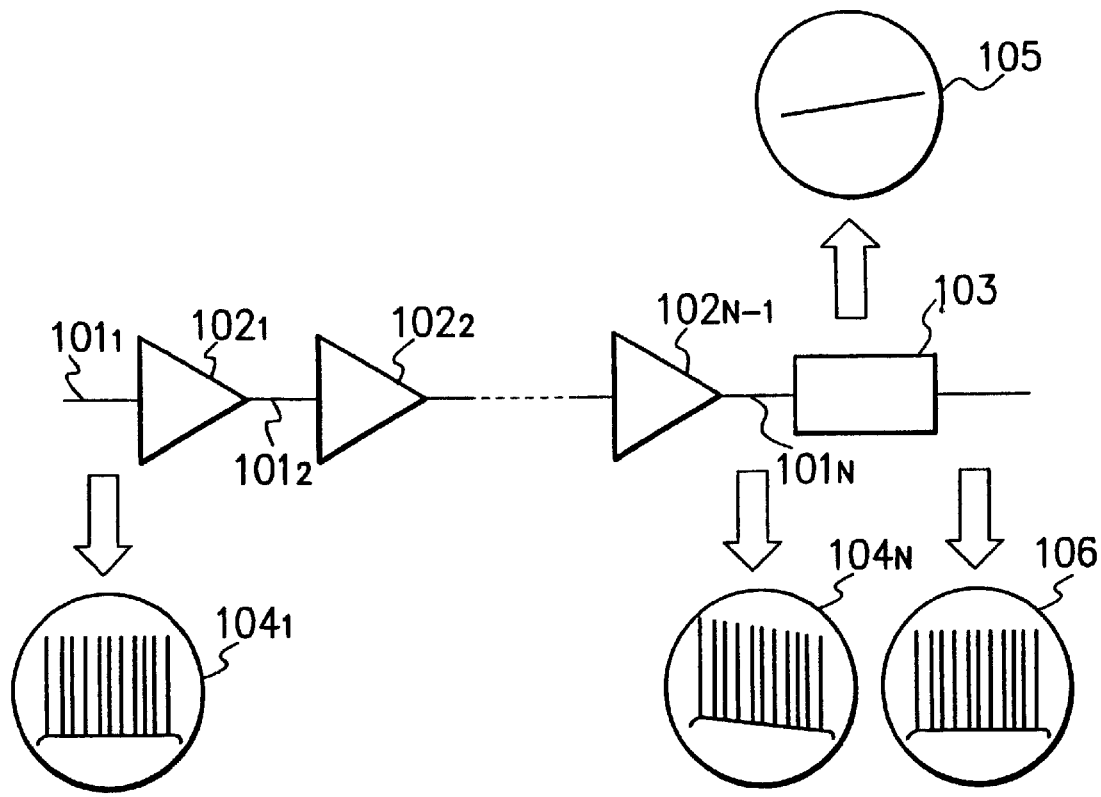
FIG. 18 is an explanatory view showing the principal part of a conventional optical transmission system together with the waveform characteristic.

FIG. 2 shows the principal part of an optical transmission system in which a block gain equalizer according to the first embodiment of the present invention is used. In this optical transmission system, portions identical to those in FIG. 18 are designated by the identical reference numerals, and description thereof will be appropriately omitted. The block gain equalizer 201 according to this embodiment is used to flatten the frequency characteristics of optical signals which have passed through a plurality of optical fiber transmission paths $101_1, 101_2, \ldots 101_N$. In the present embodiment, the block gain equalizer 201 is disposed at the terminal of a transmission path constituting an optical transmission system for convenience sake in explanation, but is inserted appropriately between the optical fiber transmission paths $101_1, 101_2, \ldots 101_N$ as required.

Figure 1:
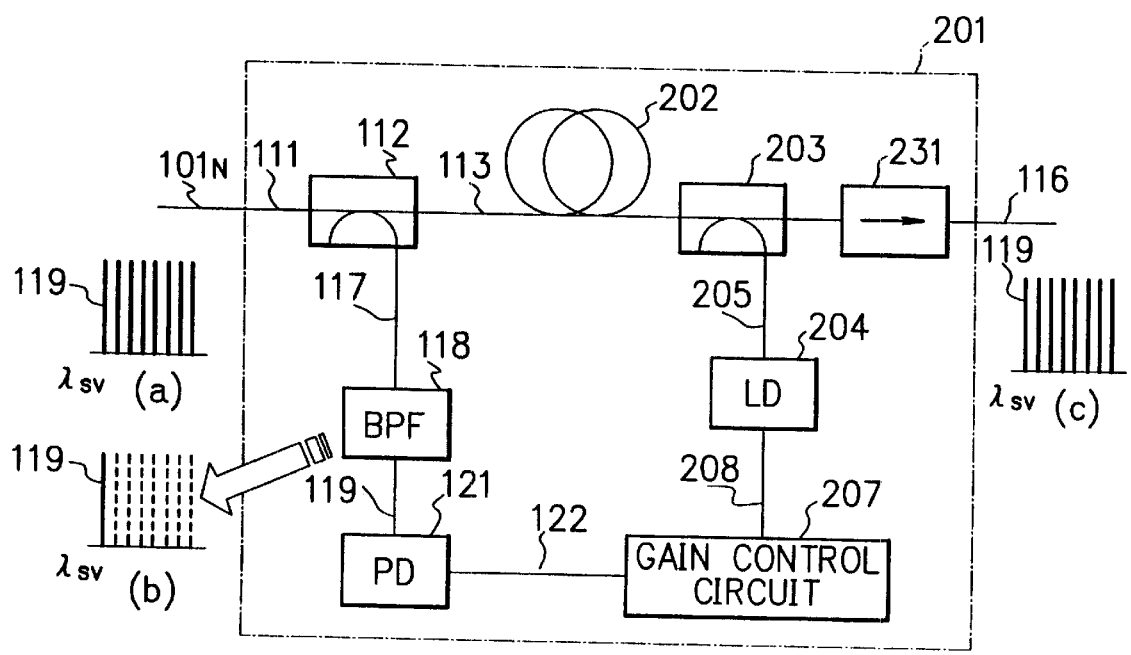
FIG. 1 is a block diagram showing a configuration of a block gain equalizer according to a first embodiment of the present invention.
Figure 19:
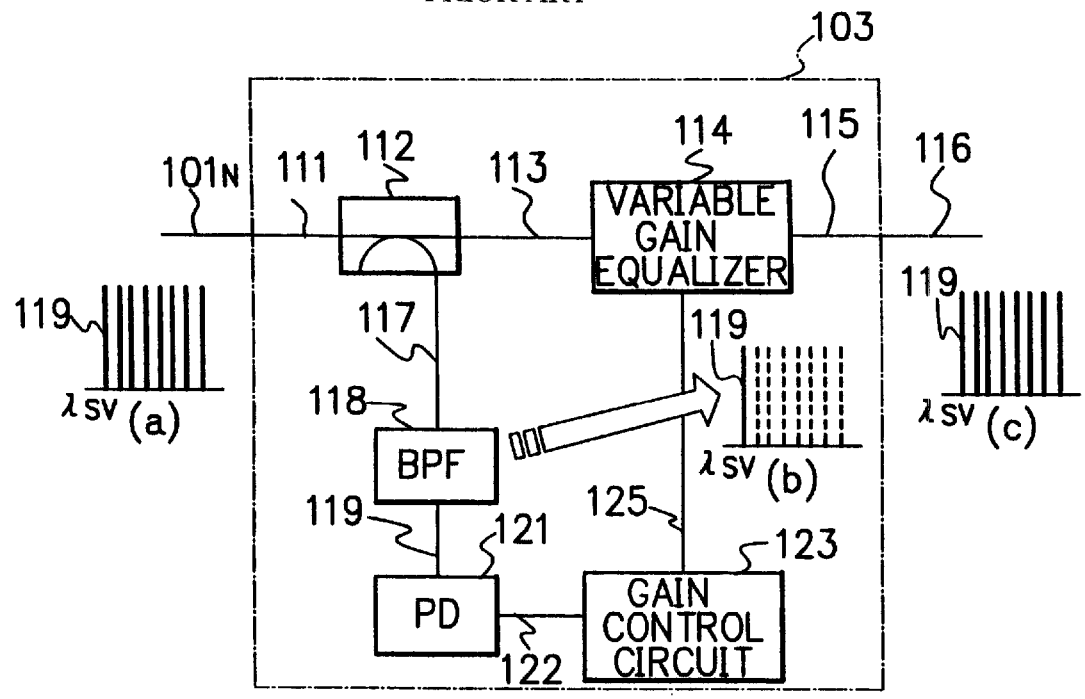
FIG. 19 is a block diagram showing a circuit configuration of a conventional block gain equalizer.
Figure 20:
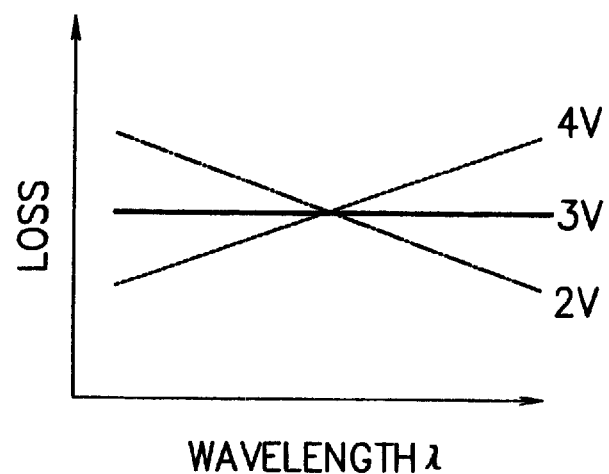
FIG. 20 is a characteristic view showing an example of a characteristic of a conventional variable gain equalizer.

FIG. 1 represents the configuration of a block gain equalizer according to the present embodiment. In this FIG. 1, portions identical to those in FIG. 19 are designated by the identical reference numerals, and description thereof will be omitted appropriately. The block gain equalizer 201 according to the present embodiment is provided with an optical coupler 112 for branching an optical signal 111 which has been transmitted along the optical fiber transmission path $101_N$. One optical signal 113 branched by the optical coupler 112 is guided as the optical signal by the erbium doped fibers 202 and is amplified. On the output side of the erbium doped fibers 202, there is disposed a WDM (Wavelength Division Multiplex) coupler 203 for injecting pumping light foslopelifying an optical signal in accordance with the backward pumping system. Pumping light 205 is adapted to be injected into the WDM coupler 203 from the semiconductor laser 204. The power of the semiconductor laser 204 is adapted to be controlled through a gain control signal 208 to be supplied from the gain control circuit 207. The gain control circuit 207 inputs an electric signal 122 to be outputted from a photodiode 121, and reads slope correction data for correcting the gain slope previously incorporated in a supervisory signal 119 to effect such control as to flatten the gain.

In such a block gain equalizer 201, one optical signal 117 branched by the optical coupler 112 is inputted into a band pass filter (BPF) 118 to select a supervisory signal 119 having wavelength $\lambda_{SV}$. This supervisory signal 119 is a signal having one predetermined type of wavelength, of optical signals having various types of wavelength to be inputted into the block gain equalizer 201 as shown at (a) in FIG. 1. (b) in FIG. 1 represents a state in which only the supervisory signal 119 has passed through the band pass filter 118. The supervisory signal 119 selected is inputted into the photodiode 121, is photoelectric-converted into an electric signal 122, is inputted into the gain control circuit 207, and the aforesaid slope correction data is read.

FIG. 3 represents relative power gain of erbium doped fibers used in the present embodiment to each wavelength. In each characteristic curve 211 to 215 shown as an exemplification in this figure, the lower is the numerical value of the reference numerical, the lower is the pumping power, and the higher is the numerical value, the higher is the pumping power. Assuming the band of the wavelength to be used for each optical signal in the optical fiber transmission path 101, in which this block gain equalizer is used, to be $\lambda_1$ to $\lambda_2$, when it is roughly expressed, the gain slope to an increase in wavelength in those bands becomes an inclination of a line segment 221 to 225 indicated by an alternate long and short dash line connected between a point of wavelength $\lambda_1$ and a point of wavelength $\lambda_2$ on those characteristic curves 211 to 215.

FIG. 4 represents relationship between pumping power of the erbium doped fibers and the gain slope. In the example shown in FIG. 3, as indicated by solid line in FIG. 4, the higher the pumping power becomes, the more the gain slope increases from a negative value to a positive value. In other words, when the erbium dopes fiber 202 of the block gain equalizer 201 shown in FIG. 1 is light-amplified in accordance with the backward pumping system, as the power of pumping light 205 to be sent out from the semiconductor laser 204, any of power indicated by each characteristic curve 211 to 215 is selected, whereby the amount of gain control is controlled, and the gain of an optical signal 111 ((c) in FIG. 1) to be outputted from the WDM coupler 203 through an optical isolator 231 can be flattened.

Of course, when even the characteristic curve shown in FIG. 3 has a different wavelength band for use in the transmission path, the gain slope in the range differs. In other words, by adjusting the band of wavelength for use, or adopting a technique such as changing the wavelength of pumping light, the lower such pumping power as indicated by an alternate long and short dash line in FIG. 4 is, it is also possible to obtain a characteristic with the greater gain slope.

FIG. 5 shows the principal part of a ROM table for controlling an amount of gain slope. When slope correction data S for correcting gain slope is taken out from the supervisory signal 119 of wavelength $\lambda_{SV}$ taken out from the band pass filter 118 shown in FIG. 1, a CPU(Central Processing Unit) not shown is adapted to read out the corresponding pumping power P and the data indicating the increased gain A from the ROM table 241 respectively with this slope correction data S as address information. If the slope correction data is, for example, $S_1$, gain slope $P_1$ for correcting this and increased gain $A_1$ will be read out.

In this case, the increased gain A is an increasing amount of gain which occurs when the pumping power is changed in order to make the gain slope different. The block gain equalizer 201 shown in FIG. 1 distinguishes the amount of attenuation of the signal on the basis of the signal level of the supervisory signal 119 of wavelength $\lambda_{SV}$ selected by the band pass filter 118. However, when the amplification factor of an optical signal due to the erbium doped fibers 202 is increased by an equalization treatment on wavelength, the increased gain A is to be read out in order to attenuate this amplification factor as required. In this case, the attenuation can be performed by the use of an attenuator having a flat characteristic with respect to each wavelength. An embodiment in which the attenuator is positively used will be described in FIG. 10 as the fourth embodiment.

Of course, when the amplification factor for each pumping power $P_1$ to $P_5$ is within the allowance, there is no need for displacement of such an attenuator having a flat characteristic. Also, when this block gain equalizer 201 is shared with any of the optical repeaters $102_1, 102_2, \ldots 102_{N-1}$, the erbium doped fibers not shown of these optical repeaters $102_1, 102_2, \ldots 102_{N-1}$, which perform the original amplification, are caused to be amplified in consideration of a change in the amplification factor to accompany the correction of gain slope, whereby the displacement of the annuator can be omitted.

As described above, in the first embodiment, desired gain slope has been determined so as to be set to the slope correction data S instructed to the block gain equalizer 201 in accordance with the slope of power for each frequency acquired, for example, by a terminal station not shown of this optical transmission system. Therefore, it is not necessary to set each distance between the optical repeaters $102_1, 102_2, \ldots 102_{N-1}$ particularly short. Also, since the gain slope is corrected in accordance with the backward pumping system in the block gain equalizer 201, it is possible to realize a high-efficiency block gain equalizer having low power consumption.

Second Embodiment

Figure 6:
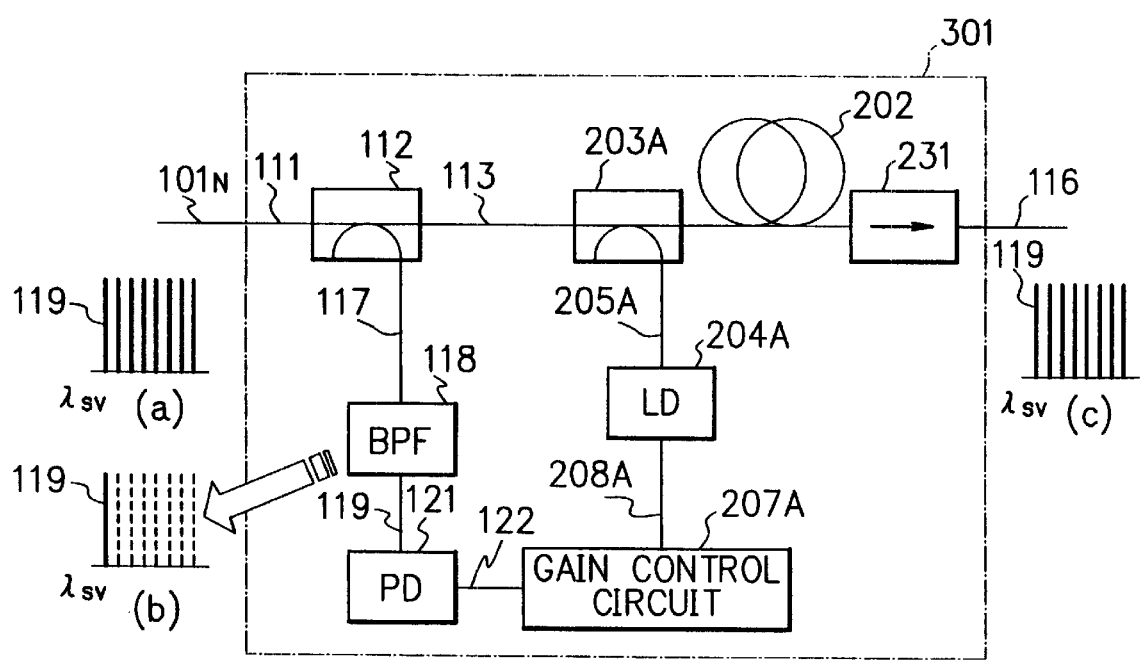
FIG. 6 is a block diagram showing the configuration of a block gain equalizer according to a second embodiment of the present invention.

FIG. 6 shows the configuration of a block gain equalizer according to a second embodiment of the present invention. In this FIG. 6, portions identical to those in FIG. 1 are designated by the identical reference numerals, and description thereof will be appropriately omitted. The block gain equalizer 301 according to the present embodiment is different from the block gain equalizer 201 according to the first embodiment, and amplifies the optical signal 111 in accordance with the forward pumping system to thereby adjust the gain slope. For this reason, an electric signal 122 to be outputted from a photodiode 121 is inputted into a gain control circuit 207A according to the forward pumping system to control the power of the pumping light 205A from the semiconductor laser 204A through a gain control signal 208 to be outputted from the gain control circuit 207A. The pumping light 205A is to be injected into the erbium doped fibers 202 through the WDM (Wavelength Division Multiplex) coupler 203A.

This block gain equalizer 301 according to the second embodiment is capable of outputting an optical signal with low noise level because the forward pumping system is adopted.

Third Embodiment

Figure 7:
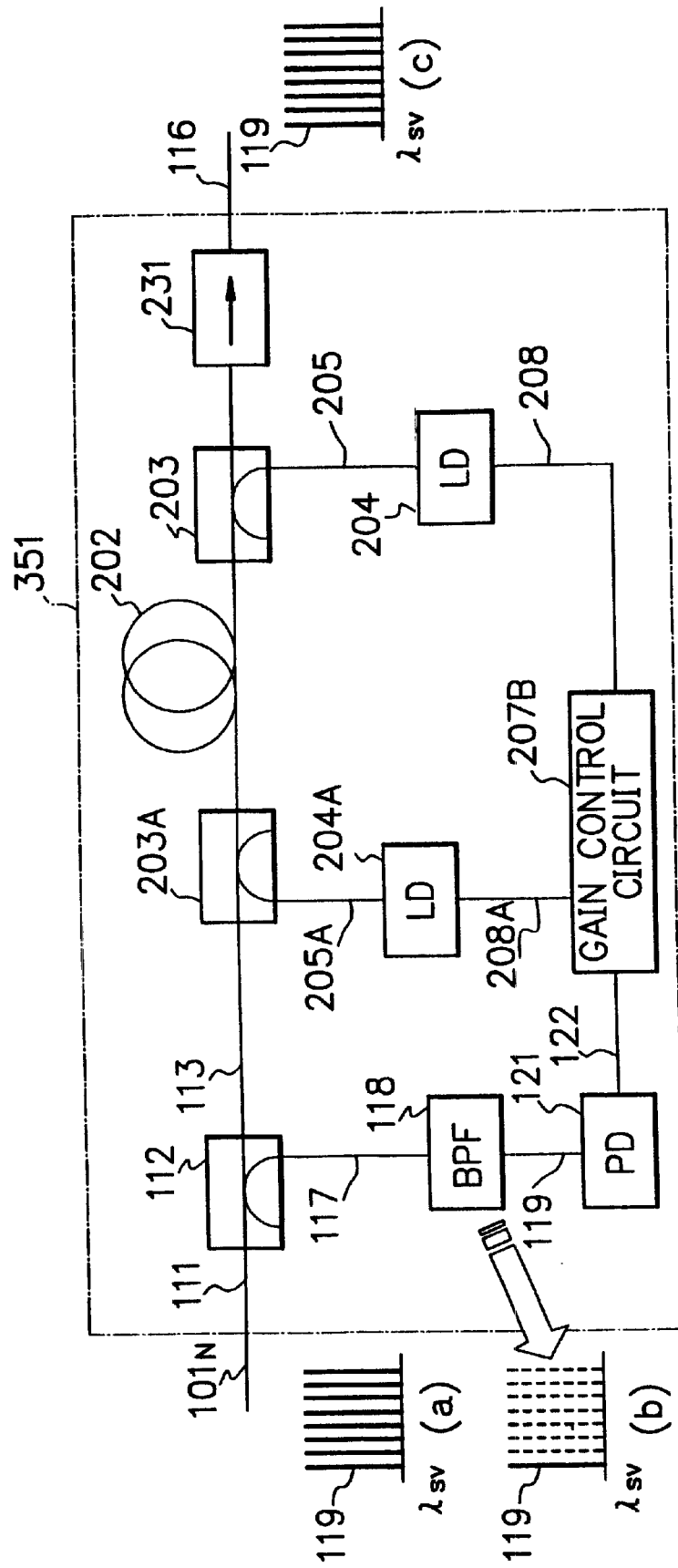
FIG. 7 is a block diagram showing the configuration of a block gain equalizer according to a third embodiment of the present invention.

FIG. 7 shows the configuration of a block gain equalizer according to a third embodiment of the present invention. In this FIG. 7, portions identical to those in FIGS. 1 and 6 are designated by the identical reference numerals, and description thereof will be appropriately omitted. The block gain equalizer 351 of the present embodiment has a configuration of a combination of the first embodiment of the backward pumping system and the second embodiment of the forward pumping system. More specifically, between the optical coupler 112 and the erbium doped fibers 202, there is disposed a WDM coupler 203A for injecting the pumping light 205A from the semiconductor laser 204A in accordance with the forward pumping system, and between the erbium doped fibers 202 and the optical isolator 231, there is disposed a WDM coupler 203 for injecting the pumping light 205 from the semiconductor laser 204 in accordance with the backward pumping system.

Figure 8:
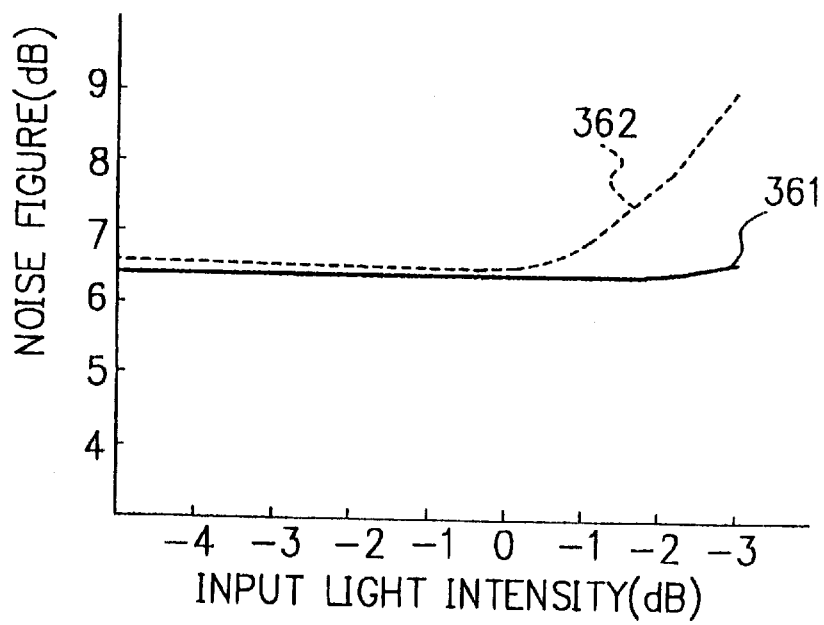
FIG. 8 is a characteristic diagram showing the relationships between intensity of input light and noise figure when a semiconductor laser having the same characteristic used in the third embodiment is used in accordance with the backward pumping system and the forward pumping system.

FIG. 8 represents the relationship between intensity of input light and noise factor when the semiconductor lasers 204 and 204A having the same characteristic to be used in this third embodiment are individually used in accordance with the backward pumping system and the forward pumping system respectively. In this figure, the solid line 361 indicates the forward pumping system and the broken line 362 indicates the backward pumping system.

In the present embodiment, when input light intensity of the photodiode 121 for inputting the supervisory signal 119 shown in FIG. 7 is under 0 dBm, the forward pumping system and the backward pumping system become substantially equal in noise factor. In this time, the high-efficiency backward pumping system with low power consumption is excellent. On the other hand, when the input light intensity exceeds 0 dBm, the backward pumping system indicated by the broken line 362 of FIG. 8 becomes larger in an amount of worsened noise factor than the forward pumping system indicated by the solid line 361. As a result, in the backward pumping system, the system performance lowers with rise in the input level. In the forward pumping system, the amount of worsened noise factor is few even if the input light intensity is increased. Thus, when the input light intensity is increased more than this 0 dBm, the forward pumping system having low noise factor becomes advantageous.

Figure 9:
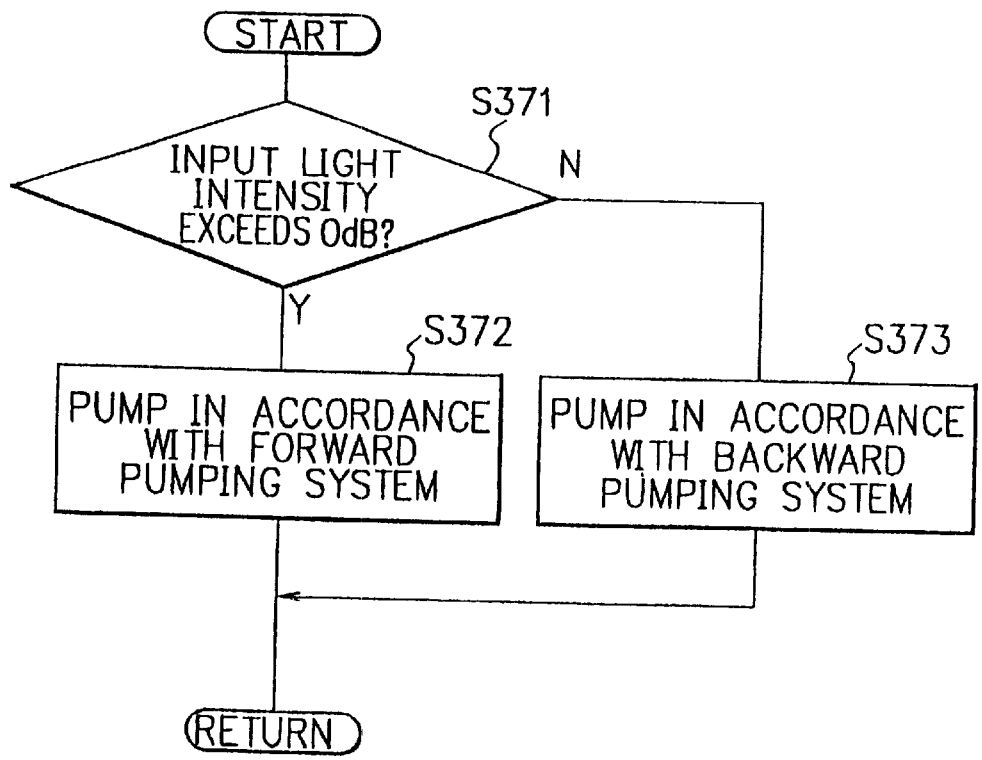
FIG. 9 is a flow chart showing a flow of a control operation of a gain control circuit according to the third embodiment.

FIG. 9 shows a flow of a control operation in a gain control circuit according to the present embodiment. A gain control circuit 207B of FIG. 7 has a CPU (Central Processing Unit), although not shown, and is adapted to be able to switch between the backward pumping system and the forward pumping system in accordance with a program stored in a ROM (Read Only Memory: not shown in the figures). That is, the CPU distinguishes the signal level of an electric signal 122 to be outputted from the photodiode 121 shown in FIG. 7, and if this exceeds 0dB (Step S371:Y), the erbium doped fibers 202 will be amplified in accordance with the forward pumping system (Step 372). In this case, a gain control signal 208A is outputted from the gain control circuit 207B, and the semiconductor laser 204A outputs pumping light 205A, but since no gain control signal 208 is outputted, the semiconductor laser 204 does not output the pumping light 205.

In contrast, when the signal level of an electric signal 122 to be outputted from the photodiode 121 is under 0dB (Step 537 1:N), the erbium doped fibers 202 is amplified in accordance with the backward pumping system (Step S373). More specifically, the gain control signal 208 is outputted from the gain control circuit 207B, and the semiconductor laser 204 outputs pumping light 205, but since no gain control signal 208A is outputted, the semiconductor laser 204A does not output pumping light 205A.

As described above, in the third embodiment, the backward pumping system and the forward pumping system have been decided to be properly used, and therefore, the high-efficiency backward pumping system with low power consumption and the forward pumping system with few amount of worsened noise factor even if the input light intensity is increased are properly used, whereby it is possible to keep the optical transmission system in a better state.

Fourth Embodiment

Figure 10:
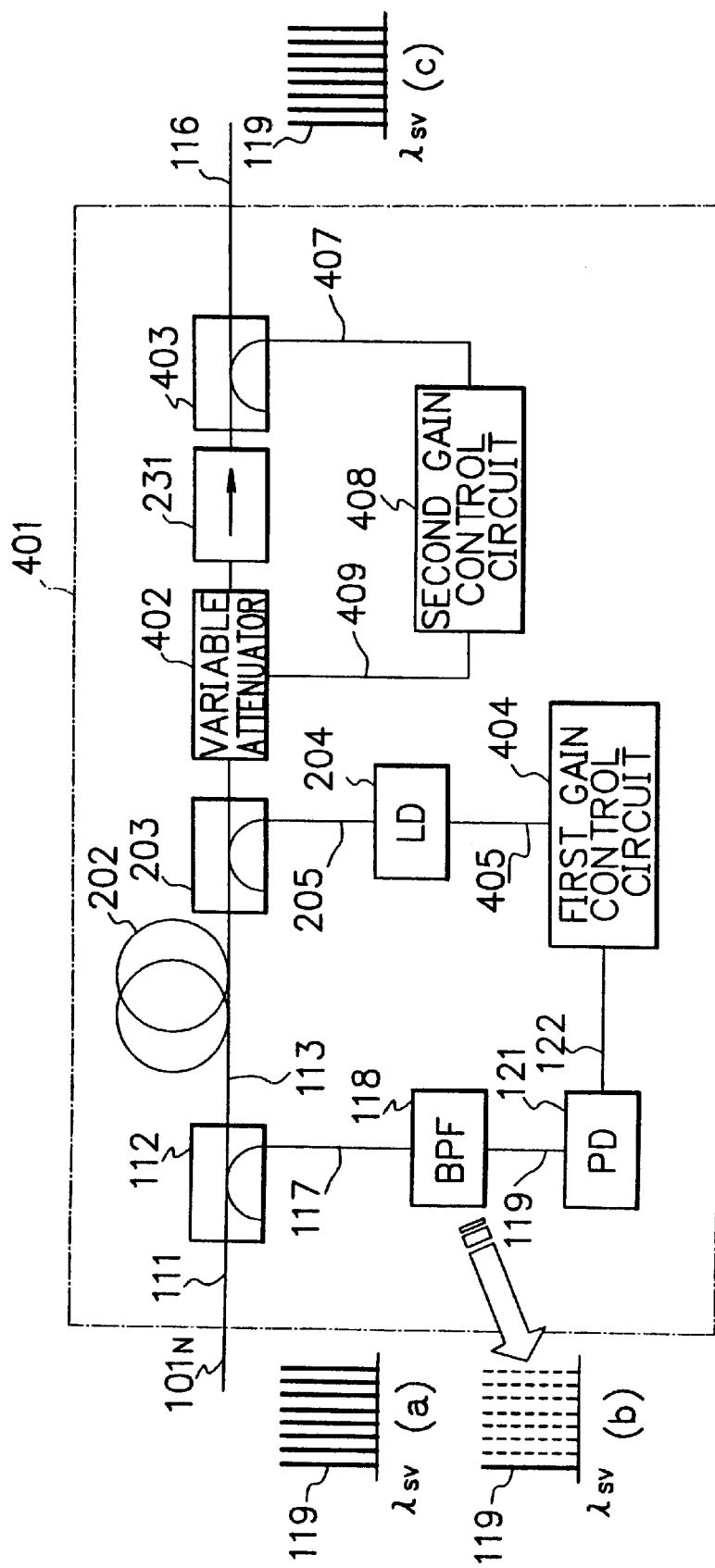
FIG. 10 is a block diagram showing the configuration of a block gain equalizer according to a fourth embodiment of the present invention.

FIG. 10 shows the configuration of a block gain equalizer according to a fourth embodiment of the present invention. In this FIG. 10, portions identical to those in FIG. 1 are designated by the identical reference numerals, and description thereof will be appropriately omitted. The block gain equalizer 401 according to the present embodiment is adapted to correct any amount in excess of additional gain caused by the control for gain slope, which has been referred to even in the first embodiment. For this reason, between the WDM coupler 203 for injecting pumping light in the backward pumping system and the optical isolator 231 disposed downstream thereof, there is disposed a variable attenuator 402 having a flat wavelength characteristic, and an optical coupler 403 for distinguishing the output level of an optical signal is disposed on this side of the optical fiber 116 on the output side.

An electric signal 122 to be outputted from the photodiode 121 according to the present embodiment is inputted to the first gain control circuit 404. A gain control signal 405 to be outputted from here is inputted into the semiconductor laser 204, and the gain slope is corrected in accordance with the backward pumping system as in the previous embodiment. On the other hand, an optical signal 407 branched by the optical coupler 403 is inputted into a second gain control circuit 408. This optical signal 407 has been amplified by the use of the erbium doped fibers 202 although the gain itself has been flattened because the gain with respect to the frequency had been corrected. Thus, the second gain control circuit 408 supplies an attenuation factor control signal 409 to the variable attenuator 402 to set the attenuation factor.

Therefore, the block gain equalizer 401 according to the fourth embodiment is capable of outputting a signal of quite the same level from the output side as that on the input side. Accordingly, there is no possibility that the gain itself is changed even if this block gain equalizer 401 is inserted in any position of the optical fiber transmission paths 101$_1$, 101$_2$, ... 101$_N$ shown in FIG. 2.

Of course, since it has the erbium doped fibers 202, the block gain equalizer 401 of the present embodiment can be used as a substitute for any of the optical repeaters 102$_1$, 102$_2$, ... 102$_{n-1}$ shown in FIG. 2. In this case, it is necessary that the signal level of the block gain equalizer 401 on the output side amplifies the signal level on the input side by a predetermined level. In this case, the attenuation factor of the variable attenuator 402 may be adjusted.

Fifth Embodiment

Figure 11:
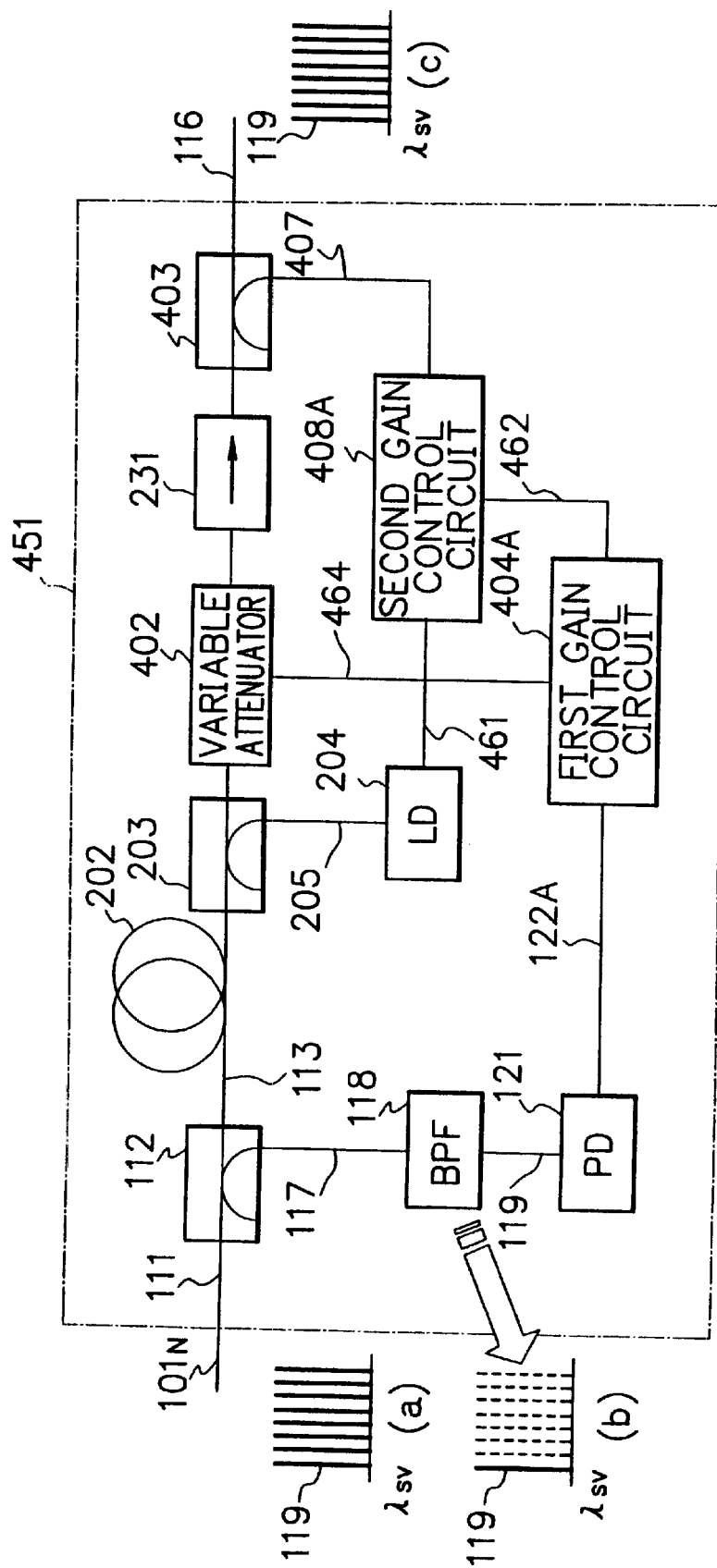
FIG. 11 is a block diagram showing the configuration of a block gain equalizer according to a fifth embodiment of the present invention.

FIG. 11 shows the configuration of a block gain equalizer according to a fifth embodiment of the present invention. In this FIG. 11, portions identical to those in FIGS. 1 and 10 are designated by the identical reference numerals, and description thereof will be appropriately omitted. The block gain equalizer 451 of the present embodiment is adapted to be able to set necessary gain slope by itself, although it is similar to the previous fourth embodiment in configuration. For this reason, an electric signal 122A representing a simple signal level to be outputted from the photodiode 121 is inputted into a first gain control circuit 404A to be controlled by a variable attenuator 402. Also, an optical signal 407 obtained by branching from an optical coupler 403 is inputted into a second gain control circuit 408A. The second gain control circuit 408A is adapted to supply a gain control signal 461 to a semiconductor laser 204 to control its gain slope, and to input increased gain data 462, which corresponds to the increased gain A of the ROM table 241, explained in FIG. 5 of the first embodiment, to the first gain control circuit 404A.

That is, according to this fifth embodiment, the second gain control circuit 408A distinguishes the loss slope of an optical signal, which is going to be outputted from the block gain equalizer 451, to determine pumping power which corresponds to gain slope for flattening the gain by the use of the erbium doped fibers 202. Thus, the second gain control circuit 408A will supply the slope correction data (See FIG. 5), which corresponds to the pumping power in the backward pumping system, to the semiconductor laser 204 as the gain control signal 461. In this time, the increased gain (See FIG. 5) corresponding to the slope correction data is inputted into the first gain control circuit 404A as the increased gain data 462. The first gain control circuit 404A distinguishes signal loss in the transmission path by the use of an electric signal 122A representing the simple signal level of the supervisory signal 119 of wavelength $\lambda_{SV}$, and distinguishes an amount of amplification common to each wavelength due to the erbium doped fibers 202 by the use of the increased gain data 462 to determine such an attenuation factor that both are offset, and the signal level to be outputted from the block gain equalizer 451 becomes a predetermined value. Thus, this will be supplied to the variable attenuator 402 as the attenuation factor control signal 464.

As a result, the block gain equalizer 451 according to the fifth embodiment is capable of autonomously flattening the gain without obtaining any data on loss slope from terminal stations and the like, and yet does not fluctuate the signal level on the output side whatever the loss slope may be.

Sixth Embodiment

Figure 12:
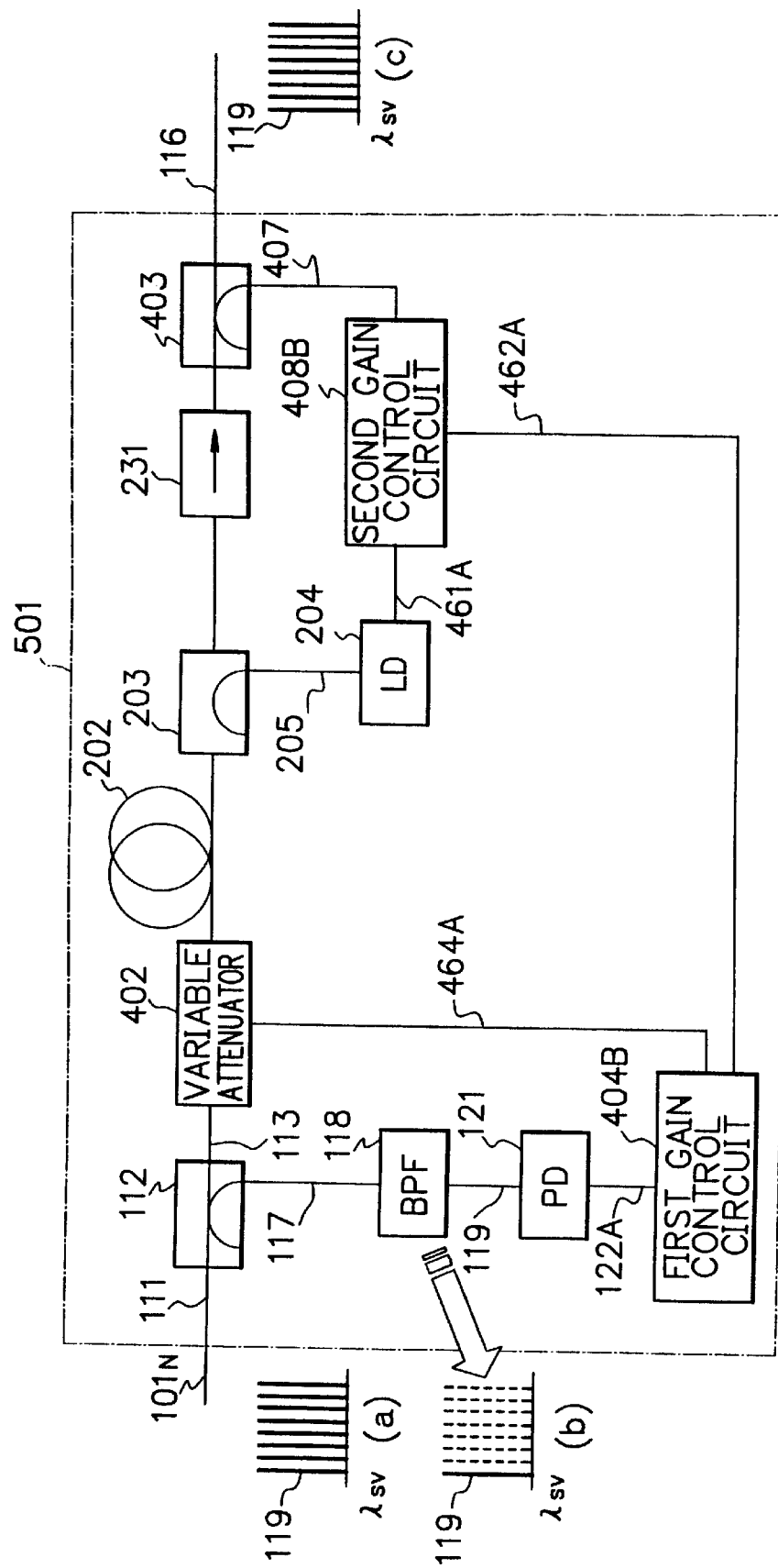
FIG. 12 is a block diagram showing the configuration of a block gain equalizer according to a sixth embodiment of the present invention.

FIG. 12 shows the configuration of a block gain equalizer according to a sixth embodiment of the present invention. In this FIG. 12, portions identical to those in FIGS. 1 and 11 are designated by the identical reference numerals, and description thereof will be appropriately omitted. The block gain equalizer 501 according to the present embodiment is the same as that of the fifth embodiment shown in FIG. 11 with the exception that the variable attenuator 402 has been moved between the optical coupler 112 and the erbium doped fibers 202. However, since the variable attenuator 402 has been disposed upstream of the erbium doped fibers 202, a single for the control and the data become delicately different. Thus, the first gain control circuit 404A is changed to the first gain control circuit 404B, the second gain control circuit 408A is changed to the second gain control circuit 408B, the attenuation factor control signal 464 is changed to the attenuation factor control signal 464A, and the gain control signal 461 is changed to the gain control signal 461A. The same is applicable to the increased gain data 462A.

Seventh Embodiment

Figure 13:
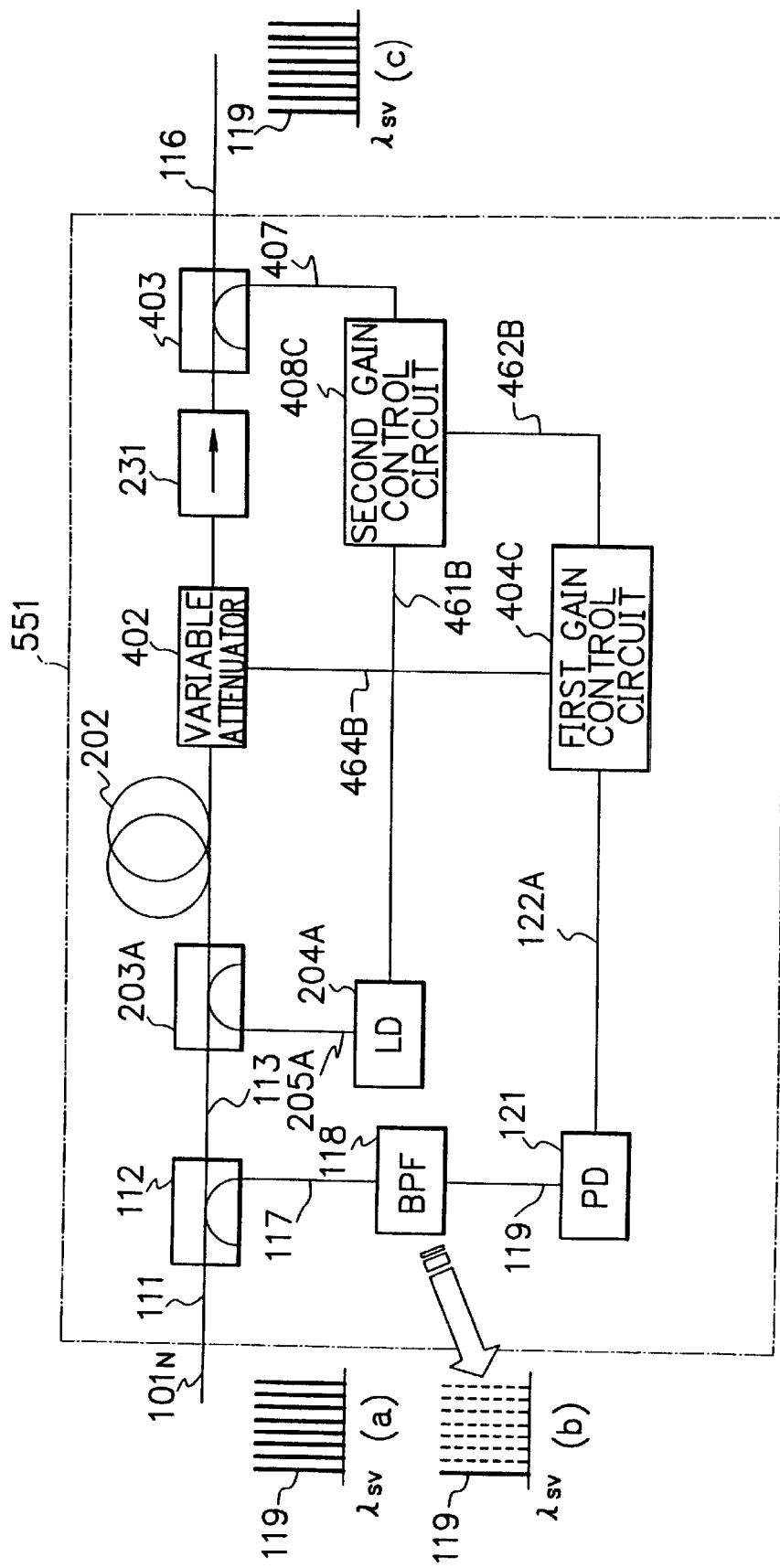
FIG. 13 is a block diagram showing the configuration of a block gain equalizer according to a seventh embodiment of the present invention.

FIG. 13 shows the configuration of a block gain equalizer according to a seventh embodiment of the present invention. In this FIG. 13, portions identical to those in FIGS. 1, 6 and 12 are designated by the identical reference numerals, and description thereof will be appropriately omitted. The block gain equalizer 551 according to the present embodiment amplifies by tilting the gain in accordance with the forward pumping system, while an unnecessary amount of the increased gain generated by the amplification is caused to be attenuated by a variable attenuator 402 disposed downstream of the erbium doped fibers 202.

For this reason, according to the present embodiment, a WDM coupler 203A is disposed between the optical coupler 112 and the erbium doped fibers 202, the gain is flattened by gain slope due to injection of pumping light 205A from the semiconductor laser 204A, and the attenuation factor of the variable attenuator 402 is adjusted through an attenuation factor control signal 464B to be outputted from the first gain control circuit 404C. The second gain control circuit 408C distinguishes the gain slope as in the previous embodiment to supply a gain control signal 461B to the semiconductor laser 204A for controlling the gain slope flat, and inputting increased gain data 462B, which corresponds to the increased gain A of the ROM table 241, explained in FIG. 5 of the first embodiment, to the first gain control circuit 404C.

Eighth Embodiment

Figure 14:
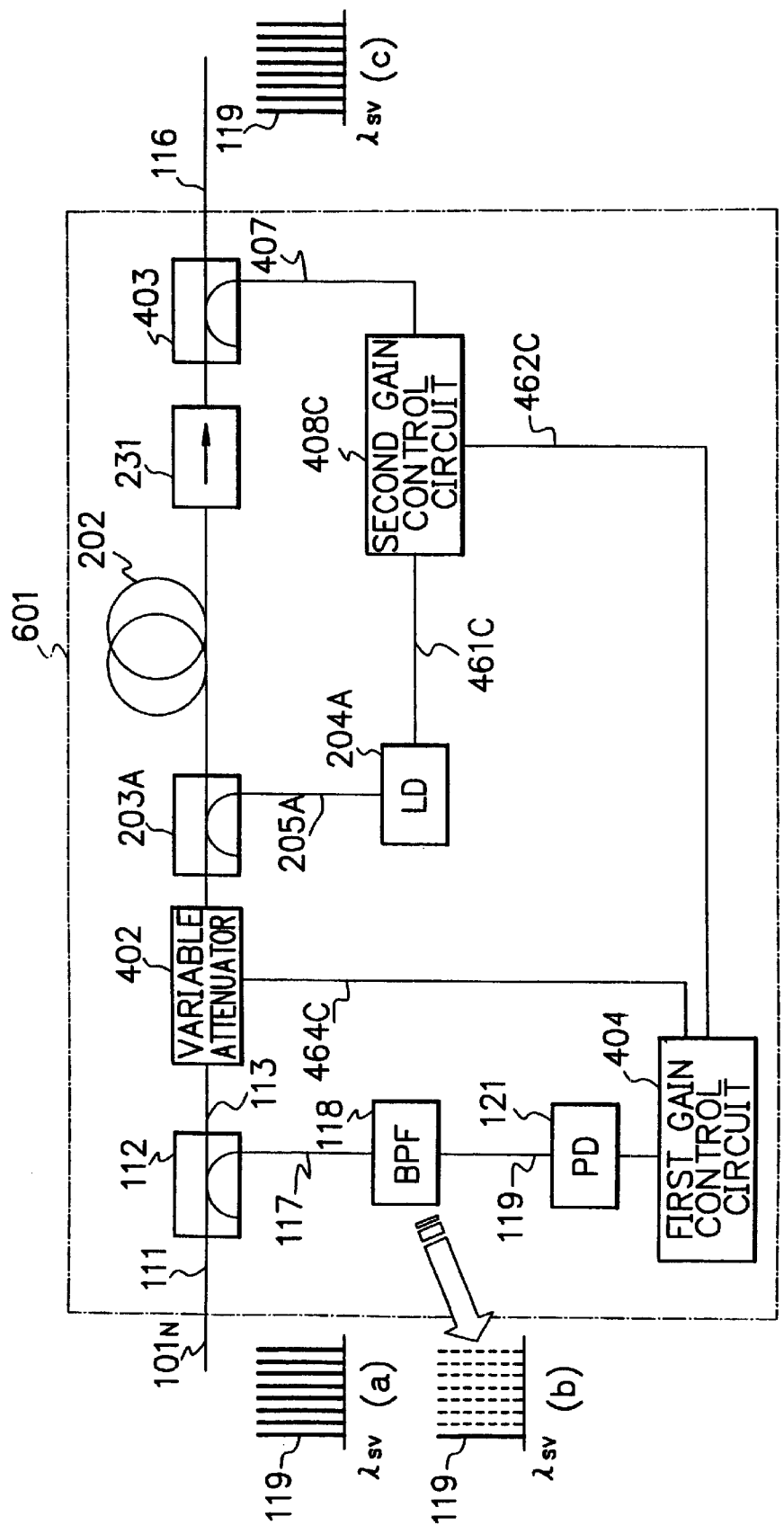
FIG. 14 is a block diagram showing the configuration of a block gain equalizer according to an eighth embodiment of the present invention.

FIG. 14 shows the configuration of a block gain equalizer according to an eighth embodiment of the present invention. In this FIG. 14, portions identical to those in FIGS. 1 and 13 are designated by the identical reference numerals, and description thereof will be appropriately omitted. In the block gain equalizer 601 according to the present embodiment, the variable attenuator 402 and the WDM coupler 203A are disposed orderly between the optical coupler 112 and the erbium doped fibers 202. The first gain control circuit 404 is used to control the gain of the variable attenuator 402 through its attenuation factor control signal 464C, and thereafter, the gain is flattened by the gain slope based on the forward pumping system.

Therefore, the second gain control circuit 408D distinguishes the gain slope as in the previous embodiment to supply a gain control signal 461 C to the semiconductor laser 204A for controlling its gain slope flat, and inputting increased gain data 462C, which corresponds to the increased gain Ai of the ROM table 241, explained in FIG. 5 of the first embodiment, to the first gain control circuit 404D.

Ninth Embodiment

Figure 15:
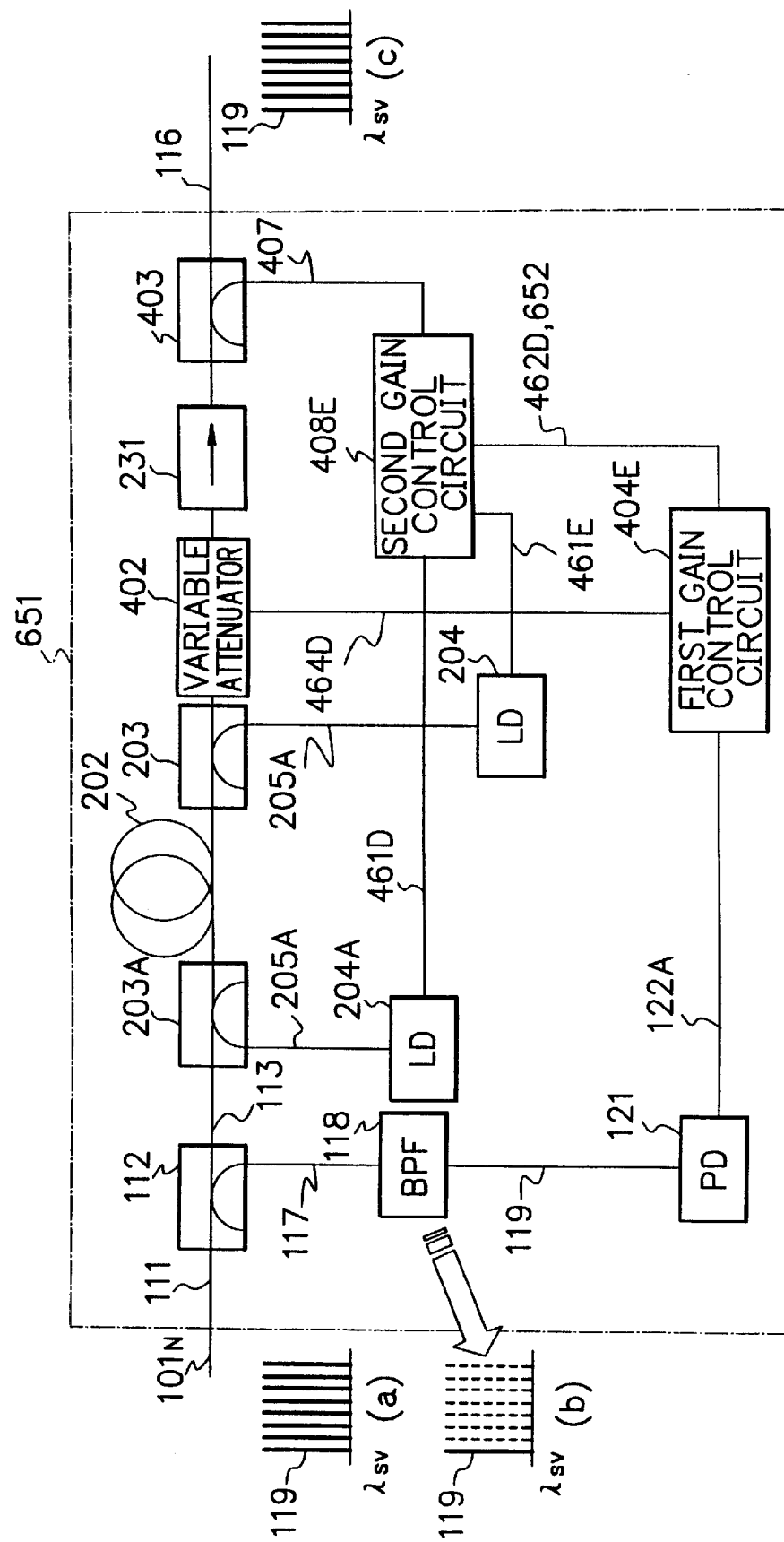
FIG. 15 is a block diagram showing the configuration of a block gain equalizer according to a ninth embodiment of the present invention.

FIG. 15 shows the configuration of a block gain equalizer according to a ninth embodiment of the present invention. In this FIG. 15, portions identical to those in FIGS. 1, 7 and 14 are designated by the identical reference numerals, and description thereof will be appropriately omitted. The block gain equalizer 651 according to the present embodiment is provided with a WDM coupler 203A and a semiconductor laser 204A for realizing the forward pumping system, and a WDM coupler 203 and a semiconductor laser 204 for realizing the backward pumping system as in the third embodiment explained in FIG. 7. The second gain control circuit 408E is commonly used in order to perform control such as switching control between these pumping systems.

This second gain control circuit 408E distinguishes the gain slope as in the previous embodiment to supply the gain control signal 461D to the semiconductor laser 204A and the gain control signal 461E to the semiconductor laser 204 respectively for controlling those gain slope flat. Also, increased gain data 462D, which corresponds to the increased gain A of the ROM table 241, explained in FIG. 5 of the first embodiment, is adapted to be inputted into the first gain control circuit 404E.

The first gain control circuit 404E receives an electric signal 122A representing the simple signal level of the supervisory signal 119 of wavelength $\lambda_{SV}$ to determine whether the gain (Step S372) is corrected in accordance with the forward pumping system in response to the input light intensity as explained in FIG. 9 in the third embodiment or the gain is corrected (Step S373) in accordance with the backward pumping system. A switching instruction signal 652 concerning this selection is transmitted from the first gain control circuit 404E to the second gain control circuit 408E.

The signal loss in the transmission path is distinguished from the analog level of the electric signal 122A, and an amount of amplification common to each wavelength due to the erbium doped fibers 202 is distinguished by the use of increased gain data based on the backward pumping system or the forward pumping system. There is determined such an attenuation factor that both are offset and the level of a signal to be outputted from the block gain equalizer 651 becomes a predetermined value. This attenuation factor will be supplied to the variable attenuator 402 as an attenuation factor control signal 464D. In this ninth embodiment, since the backward pumping system and the forward pumping system are used at the same time, for the same table as the ROM table 241 shown in FIG. 5, it is preferable to prepare two types of tables corresponding to these pumping systems respectively.

Since in the ninth embodiment, the backward pumping system and the forward pumping system have been properly used as in the third embodiment as described above, the optical transmission system can be kept in a better condition by properly using the high-efficiency backward pumping system with low power consumption and the forward pumping system which has a less amount of worsened noise factor even though the input light intensity is increased. Moreover, there is an advantage that the level of an optical signal to be outputted from the block gain equalizer 651 can be set to a desired value.

Tenth Embodiment

Figure 16:
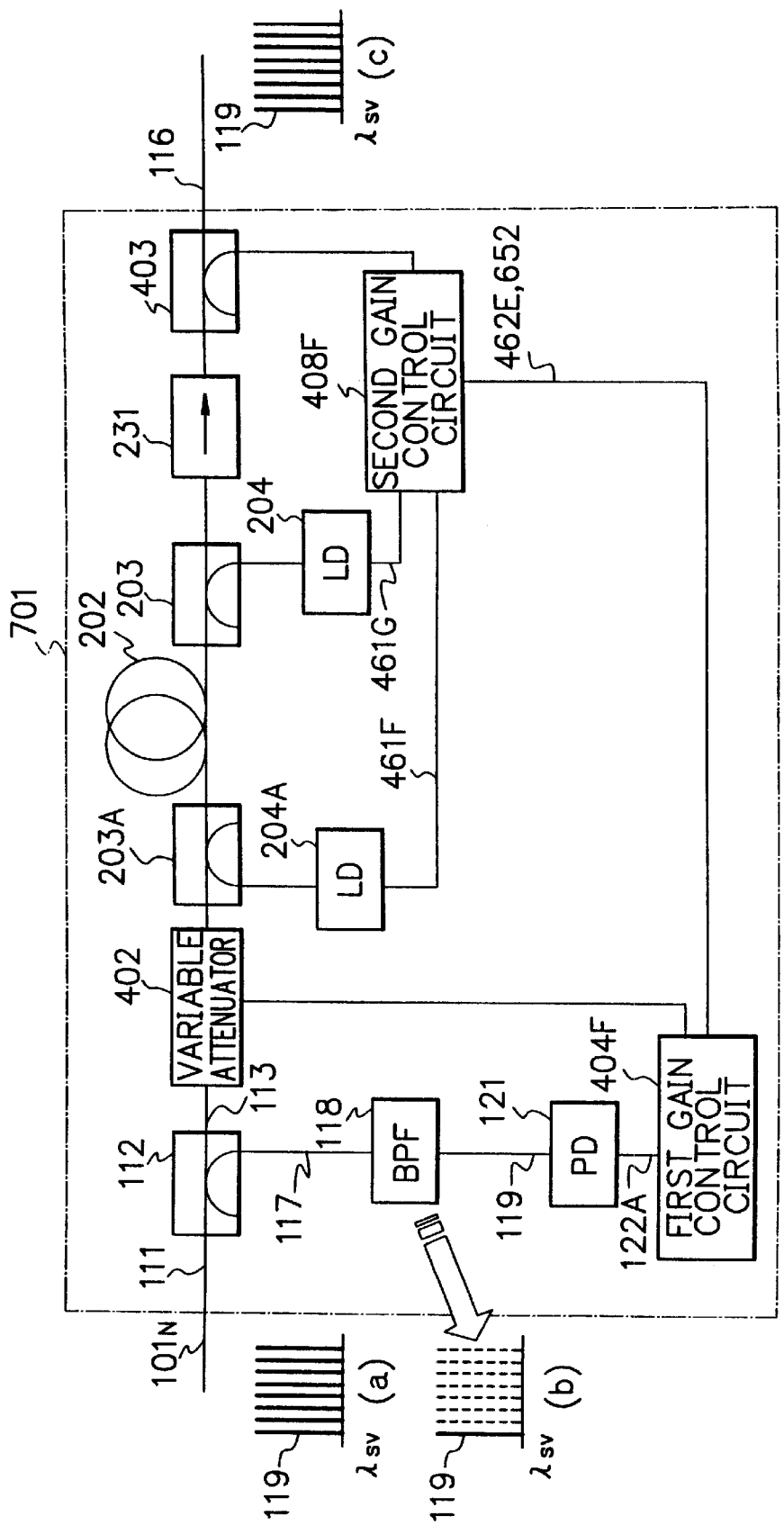
FIG. 16 is a block diagram showing the configuration of a block gain equalizer according to a tenth embodiment of the present invention.
Figure 17:
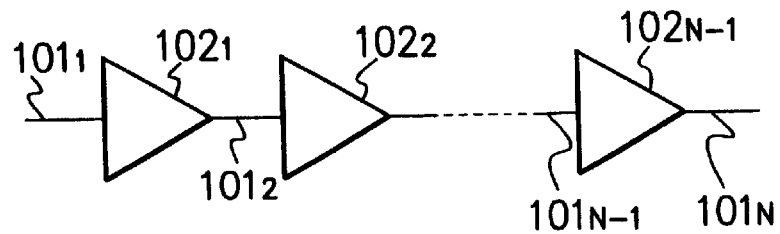
FIG. 17 is a block diagram showing the principal part of an optical transmission path in which optical fiber transmission paths are connected together.

FIG. 16 shows the configuration of a block gain equalizer according to a tenth embodiment of the present invention. In this FIG. 16, portions identical to those in FIGS. 1, and 15 are designated by the identical reference numerals, and description thereof will be appropriately omitted. The block gain equalizer 701 according to the present embodiment uses the forward pumping system and the backward pumping system by switching as in the block gain equalizer 651 shown in FIG. 15, and is adapted to attenuate the gain by the use of the variable attenuator 402. In the present embodiment, this variable attenuator 402 is disposed upstream of the erbium doped fibers 202. In any other points than it, the present embodiment has the same circuit configuration as the previous ninth embodiment.

Even in this tenth embodiment, the backward pumping system and the forward pumping system have been properly used and therefore, the optical transmission system can be kept in a better state by properly using the high-efficiency backward pumping system with low power consumption and the forward pumping system which has a less amount of worsened noise factor even though the input light intensity is increased. Moreover, there is an advantage that the level of an optical signal to be outputted from the block gain equalizer 701 can be set to a desired value.

In the first to tenth embodiments described above, there have been used the erbium doped fibers 202 as the light amplifier within the block gain equalizer. However, doped fibers added with any rare earth elements other than this can be similarly used. Also, in the fourth embodiment and the subsequent embodiments, there has been used the variable attenuator 402 with a flat wavelength characteristic, but it will suffice so long as the sum of gain slope due to doped fibers such as erbium doped fibers 202 and loss slope of the variable attenuator is equal to a desired frequency characteristic, and therefore, the frequency characteristic of the variable attenuator does not necessarily require a flat characteristic.

As described above, according to the present invention specified in claims 1 to 4, focusing attention to the fact that when the power of the pumping light to be injected into the doped fibers added with rare earth elements is appropriately adjusted, the frequency characteristic of the gain due to the doped fibers changes, a block gain equalizer to be disposed in the transmission path in order to equalize the gain is caused to contain the doped fibers, and the power of the pumping source is set to power which corresponds to gain characteristic for correcting the frequency characteristic of an optical signal to flatten the gain. Therefore, the gain is not reduced as compared with when the attenuator is used to flatten the gain, but it is not necessary to make a section in the transmission path where block gain equalizers are disposed shorter than other sections. Therefore, it is possible to simplify design for the work. Also, when the same gain as the repeater occurs, the repeater between the section can be also omitted.

Also, according to the invention specified in claims 2 to 4, since an attenuator has been disposed in addition to the doped fibers and the pumping source, the optical signal can be outputted after the gain is equalized without changing the level of a signal inputted at all, and in this case, a block gain equalizer can be freely inserted at any place in the transmission path, and it is not necessary to adjust the length of the section due to the insertion.

Further, according to the invention specified in claim 4, since characteristic distinguishing means for distinguishing the frequency characteristic of an optical signal is contained, it becomes possible to autonomously flatten the gain, and even when the frequency characteristic changes for some cause or other, it can be coped with immediately.

According to the invention specified in claim 5, since the pumping source pumps the doped fibers in accordance with the backward pumping system, it is possible to realize a high-efficiency block gain equalizer with low power consumption.

Further, according to the invention specified in claim 6, since the pumping source pumps the doped fibers in accordance with the forward pumping system, it is possible to realize a block gain equalizer having a less amount of worsened noise factor even though the input light intensity is increased.

Also, according to the invention specified in claim 7, since the pumping source consists of a light source for the backward pumping system and a light source for the forward pumping source, and any of these is selected in an alternative way under predetermined conditions to pump the doped fibers, the optical transmission system can be kept in a better state by properly using the high-efficiency backward pumping system with low power consumption and the forward pumping system which has a less amount of worsened noise factor even though the input light intensity is increased.

What is claimed is:

1. A block gain equalizer, comprising:
doped fibers added with a rare earth element for receiving an optical signal transmitted from a transmission path on an upstream side and relaying to a transmission path on a downstream side;
a pumping source for injecting pumping light to said doped fibers; and
a power setting means for setting power of the pumping light outputted by said pumping source to power which corresponds to a gain characteristic for correcting a frequency characteristic of the optical signal transmitted from said transmission path.

2. The block gain equalizer according to claim 1, wherein said pumping source pumps said doped fibers in accordance with a backward pumping system.

3. The block gain equalizer according to claim 1, wherein said pumping source pumps said doped fibers in accordance with a forward pumping system.

4. The block gain equalizer according to claim 1, wherein said pumping source comprises a light source for a backward pumping system and a light source for a forward pumping system, and one of these light sources is selected under predetermined conditions to pump said doped fibers.

5. A block gain equalizer, comprising:
doped fibers added with a rare earth element for receiving an optical signal transmitted from a transmission path on an upstream side and relaying to a transmission path on a downstream side;
a pumping source for injecting pumping light to said doped fibers;
a power setting means for setting power of the pumping light to be outputted by said pumping source to power which corresponds to a gain characteristic for correcting the frequency characteristic of the optical signal transmitted from said transmission path; and
an attenuator for attenuating, by a predetermined amount, the optical signal amplified by said doped fibers by the use of the pumping light of the power set by said power setting means.

6. The block gain equalizer according to claim 5, wherein said pumping source pumps said doped fibers in accordance with a backward pumping system.

7. The block gain equalizer according to claim 5, wherein said pumping source pumps said doped fibers in accordance with a forward pumping system.

8. The block gain equalizer according to claim 5, wherein said pumping source comprises a light source for a backward pumping system and a light source for a forward pumping system, and one of these light sources is selected under predetermined conditions to pump said doped fibers.

9. A block gain equalizer, comprising:
doped fibers added with a rare earth element for receiving an optical signal transmitted from a transmission path on an upstream side and relaying to a transmission path on a downstream side;
a pumping source for injecting pumping light into said doped fibers;
characteristic storing means in which there is stored in advance, a frequency characteristic of an amplification factor relative to various values of power in injecting the pumping light into said doped fibers;
power setting means for setting power of the pumping light corresponding to a desired frequency characteristic stored in said characteristic storing means on the basis of data on an instruction to flatten the frequency characteristic of said optical signal; and
an attenuator for attenuating, when the amplification factor of the optical signal amplified by said doped fibers by the use of the pumping light of power set by said power setting means is higher than a desired value, the amplification factor to the desired value.

10. The block gain equalizer according to claim 9, wherein said pumping source pumps said doped fibers in accordance with a backward pumping system.

11. The block gain equalizer according to claim 9, wherein said pumping source pumps said doped fibers in accordance with a forward pumping system.

12. The block gain equalizer according to claim 9, wherein said pumping source comprises a light source for a backward pumping system and a light source for a forward pumping system, and one of these light sources is selected under predetermined conditions to pump said doped fibers.

13. A block gain equalizer, comprising:
doped fibers added with a rare earth element for receiving an optical signal transmitted from a transmission path on the upstream side and relaying to a transmission path on the downstream side;
a pumping source for injecting pumping light into said doped fibers;
characteristic storing means in which there are stored in advance, frequency characteristics of amplification factors relative to various values of power in injecting the pumping light into said doped fibers;
characteristic distinguishing means for distinguishing the frequency characteristic of said optical signal;
power setting means for selecting an optimum frequency characteristic to flatten the frequency of a characteristic distinguished from among the frequency characteristics stored in said characteristic storing means by said characteristic distinguishing means to set power of the pumping light corresponding thereto; and
an attenuator for attenuating, when the amplification factor of the optical signal amplified by said doped fibers by the use of the pumping light of power set by said power setting means is higher than a desired value, the amplification factor to the desired value.

14. The block gain equalizer according to claim 13, wherein said pumping source pumps said doped fibers in accordance with a backward pumping system.

15. The block gain equalizer according to claim 13, wherein said pumping source pumps said doped fibers in accordance with a forward pumping system.

16. The block gain equalizer according to claim 13, wherein said pumping source comprises a light source for a backward pumping system and a light source for a forward pumping system, and one of these light sources is selected under predetermined conditions to pump said doped fibers.

17. An optical transmission system block gain equalizer, comprising:
a rare-earth-doped optical fiber receiving an input optical signal transmitted from an optical transmission path on an upstream side and outputting said optical signal to an optical transmission path on a downstream side;
an optical coupler for sampling said input optical signal;
a photodiode receiving said sampled input optical signal and converting it into an electrical signal;

a gain controller receiving an electrical signal representing said sampled input optical signal and providing a controller output signal to correct a gain slope error of said input optical signal, said controller reading a pre-stored gain slope correction data for producing said controller output signal;

at least one semiconductor laser receiving said gain controller output signal and providing pumping light in response to said gain controller output signal; and at least one coupler for injecting said pumping light into said optical signal.

18. The block gain equalizer of claim 17, further comprising:

a band pass filter receiving said sampled input optical signal and providing a filtered signal to become said electrical signal representing said sampled input optical signal into said gain controller.

19. The block gain equalizer of claim 17, wherein said at least one semiconductor laser and said at least one coupler comprises:

a first semiconductor laser and a first coupler to provide a forward pumping system; and a second semiconductor laser and a second coupler to provide a backward pumping system, wherein said controller causes said forward pumping system and said backward pumping system to provide pumping light based on a predetermined different condition.

20. The block gain equalizer of claim 17, further comprising:

a variable attenuator controlled in such a manner that a level of said optical signal to said optical transmission path on said downstream side is essentially equal to a level of said input optical signal transmitted from said optical transmission path on said upstream side.

* * * * *